2,742,147
Patented Apr. 17, 1956

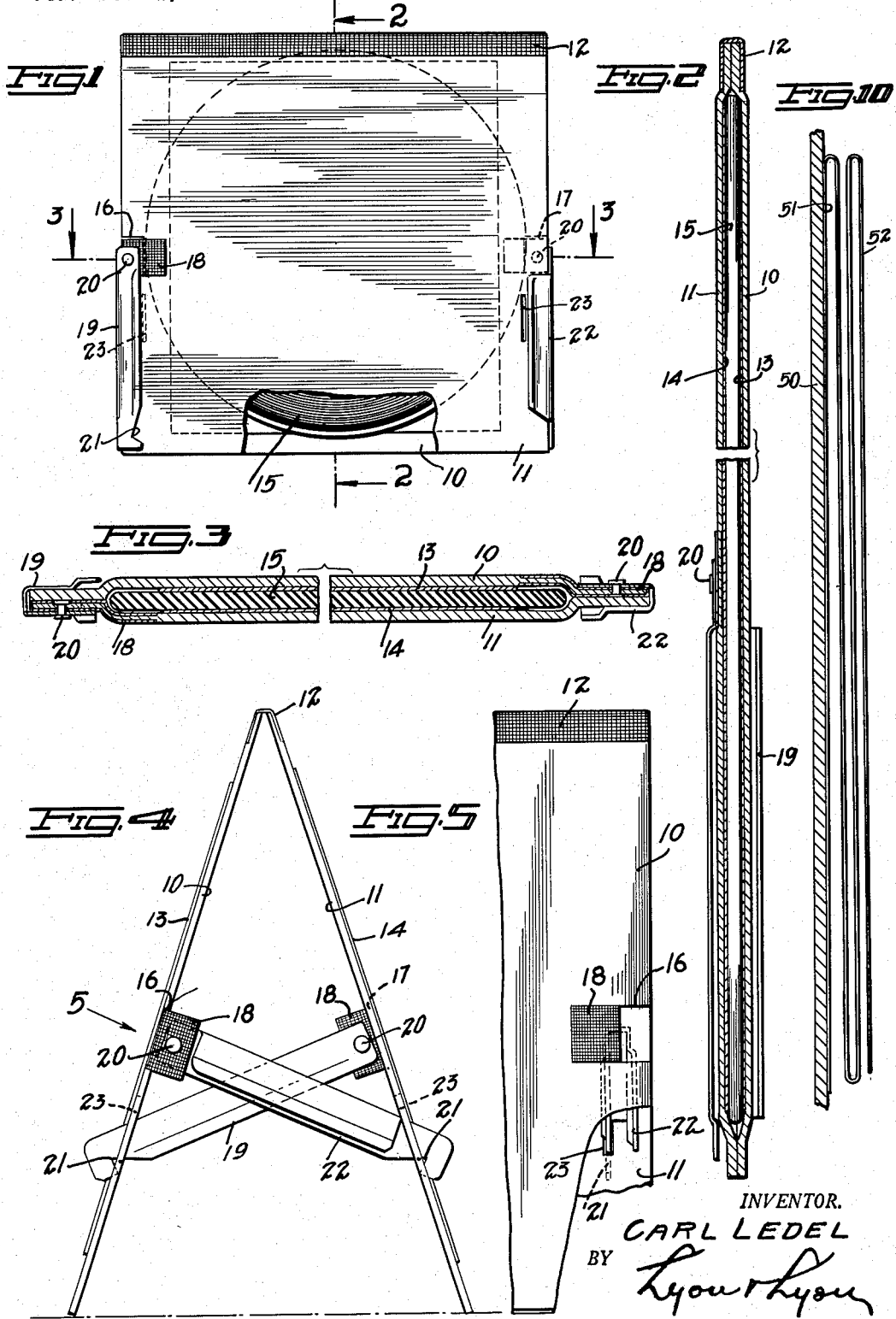
April 17, 1956 — C. LEDEL — 2,742,147
COMBINED RECORD CARRIER AND MUSIC STAND
Filed Feb. 2, 1953 — 2 Sheets-Sheet 1
INVENTOR.
CARL LEDEL
BY
ATTORNEYS April 17, 1956  C. LEDEL  2,742,147
COMBINED RECORD CARRIER AND MUSIC STAND
Filed Feb. 2, 1953  2 Sheets-Sheet 2
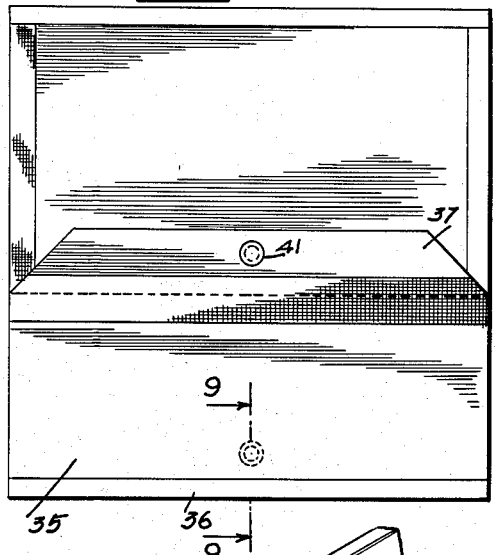
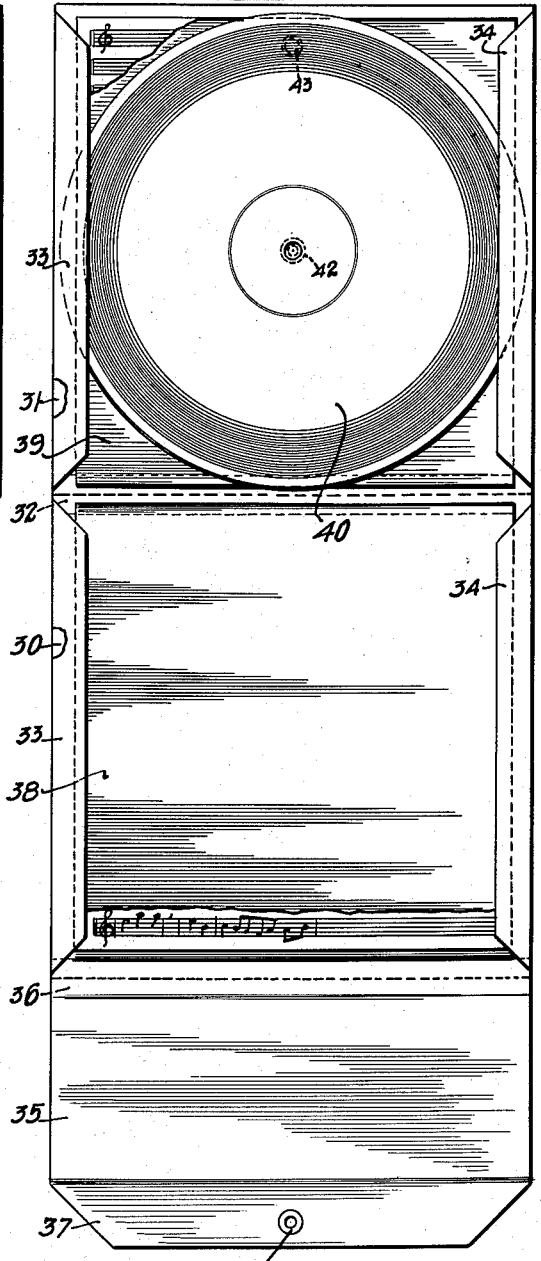
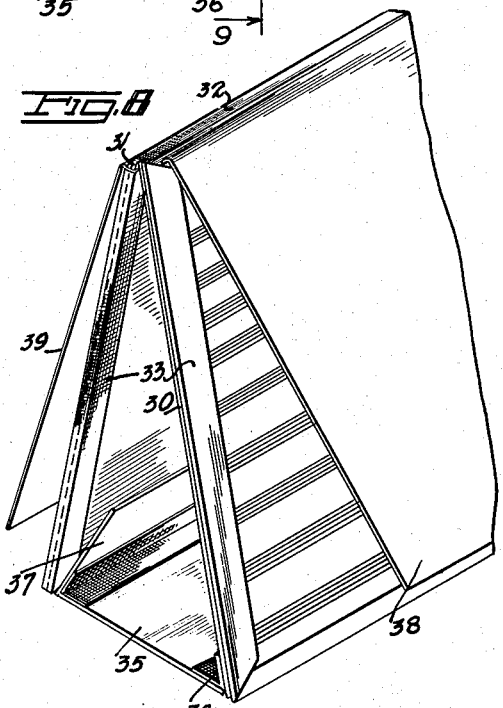
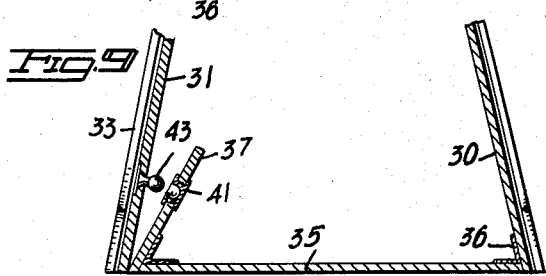
INVENTOR.
CARL LEDEL
BY
*Lyon & Lyon*
ATTORNEYS

United States Patent Office

2,742,147

COMBINED RECORD CARRIER AND MUSIC STAND

Carl Ledel, Los Angeles, Calif.

Application February 2, 1953, Serial No. 334,648

1 Claim. (Cl. 206—62)

This invention relates to a combined record carrier and music stand.

It is one object of this invention to provide a record holder or carrier which folds up when in use as a carrier to house and protect the record but which may be opened up to remove the record and expose, in easily readable manner, sheet music.

It is a feature of this invention that the sheet music carried on the interior of the record holder may correspond with the music recorded upon the record, thus enabling a student or musician to accompany himself by playing the record and by following the same on the music.

It is another feature of this invention that the material of which the record carrier is made is sturdy, enabling the same to be reversed to form a substantial music stand.

These and other objects and advantages of the invention will be apparent from the annexed specification in which:

Figure 1 is a plan view showing a device embodying the invention with parts broken away for clarity of illustration.

Figure 2 is an enlarged vertical section taken along the line 2—2 of Figure 1.

Figure 3 is a horizontal section taken along the line 3—3 of Figure 1.

Figure 4 is an end elevation showing the device of Figure 1 folded to form a music stand.

Figure 5 is a partial front view of one corner of the stand looking in the direction of the arrow 5 of Figure 4.

Figure 6 is a plan view of an alternative form of this invention.

Figure 7 is an open view of the device shown in Figure 6.

Figure 8 is a fragmentary perspective of the device shown in Figure 6 folded to form a music stand.

Figure 9 is a fragmentary vertical section of the device shown in Figure 8.

Figure 10 is a partial side elevation of a further embodiment of the invention, designed to accommodate long sheets of music.

Referring now more particularly to the drawings and particularly Figures 1 through 5, the device as shown comprises a pair of sheets 10 and 11, preferably made of cardboard, hinged together at the top preferably by means of an adhesive bearing tape 12. The sheets 10 and 11 on their inner sides have attached thereto paper sheets 13 and 14 upon which is printed in musical notation the music, which same music is recorded upon a mechanically grooved phonograph record 15 housed within the carrier.

It will be appreciated that in lieu of the separate sheets 13 and 14 the music may be printed directly upon the inner sides of the sheets 10 and 11. Sheet 11 is slotted at one side thereof as at 16 and 17 and preferably reinforced by an adhesive bearing tape 18. A channel shaped member 19 is pivotally attached as by the rivet 20 to the tab formed by the slots 16 and 17. Channel shaped member 19 is notched as at 21 for purposes hereinafter described.

It will be appreciated that the mechanism just described in connection with the sheet 11 is duplicated upon the back of sheet 10 in connection with the similar channel shaped member 22. The channel shaped members 19 and 22 are adapted to have the two flanges thereof overlying the edges of the sheets 10 and 11 as clearly shown in Figure 3 when the device is used as a carrier.

When it is desired to use the device as a music stand, the channel shaped members 19 and 22 are pivoted so as to release the sheets 10 and 11 and the record 15 is moved therefrom. Thereafter the device is folded so as to reverse the sheets 10 and 11 in such manner that the sheets 13 and 14 are upon the outside. The tabs formed by the slots 16 and 17 are swung inwardly. Each sheet 10 and 11 is provided with a slot 23 and the ends of the members 19 or 22 are extended through said slots with the notches 21 engaging the bottom thereof as clearly shown in Figure 4. In this position, the music printed on the sheets 13 and 14 will be disposed in easily readable arrangement, and the user can read the music, and if he so desires play the same while simultaneously playing the record upon a record player.

It will be appreciated that sheet 13 may carry the music which is recorded upon one side of the record 15 while sheet 14 may carry the music for the other side of the record.

Referring now more particularly to Figures 6 through 9, there is shown an alternative form of the invention. This form of the invention utilizes two sheets of cardboard 30 and 31 hinged together, preferably by an adhesive bearing tape 32. Each of the sheets 30 and 31 is provided with inturn flanges 33 and 34 and at the bottom, the sheet 30 has hinged thereto an extension 35, preferably by means of an adhesive bearing tape 36. The extension 35 has hinged thereto a tab 37. Each of the sheets 30 and 31 is provided with a sheet 38 or 39. The sheet 38 may have one end thereof housed within the flanges 33 and 34 and may have another portion folded back upon this portion as shown in Figure 8. Music corresponding to one side of a record 40 may be printed on the inner side of the sheets 38 and 39. Tab 37 is provided with the socket member 41 of a stud and socket type snap fastener. Sheet 31 upon the rear thereof is provided with a pair of spaced studs 42 and 43 designed to cooperate with the socket 41.

As shown in Figure 6, the device is folded to function as a carrier and the socket 41 is engaged with the stud 42. As shown in Figure 8, the device of Figure 6 has been opened up as shown in Figure 7 and reversed about the hinge 32. The extension 35 has been folded inwardly about the hinge 36 and the tab 37 has been folded upwardly in position to engage the socket 41 with the stud 43. In this position, the device is oriented to function as a music stand.

It will be appreciated that either sheet 38 or sheet 39 may be folded over the top of the music stand to expose the music thereon, the music on one half of the sheet 38 or the sheet 39 being printed on the interior of the sheet upside down, as shown in Figure 8, so that upon being folded over the top of the stand, it will be in readable position.

Referring now more particularly to Figure 10, there is shown merely one of the sheets 10, 11, 30 or 31, herein marked 50, and the sheet 50 has attached thereto a sheet 51 of considerable length. The sheet 51 is thus adapted to have printed thereon the music of a very long number, and it is contemplated that when folded up, the device will have the sheet 51 folded accordionwise, as indicated at 52, to accommodate the long sheet of music.

While there has been described what are at present considered preferred embodiments of the present invention, it will be appreciated by those skilled in the art that various changes and modifications can be made there-

I claim:

A combined record carrier and music stand comprising a pair of rigid sheets hinged together along one edge; a member hinged to one of said sheets and overlying the other of said sheets when said sheets are folded into parallel position, said member being secured to said other sheet to form an enclosed record carrier; said sheets being disposed at an acute angle to each when unfolded with said member engaging said other sheet across said angle and being secured thereto to dispose said sheets as a rigid V-shaped music stand; said member comprising a channel shaped member hingedly and pivotally connected to one of said sheets at one side thereof and having one of its flanges overlying the edges of both of said sheets in closed position; a slot in said other sheet; said channel-shaped member having a notched end engaging said slot when said sheets are unfolded and disposed as a music stand.

References Cited in the file of this patent

UNITED STATES PATENTS

| | | |
|---|---|---|
| 1,339,194 | Grammich | May 4, 1920 |
| 2,089,765 | Shaw | Aug. 10, 1937 |
| 2,219,492 | Prichap | Oct. 29, 1940 |
| 2,389,511 | Horr | Nov. 20, 1945 |
| 2,566,300 | Adam | Sept. 4, 1951 |
| 2,603,018 | Cross | July 15, 1952 |